Patented Aug. 14, 1934

1,969,857

UNITED STATES PATENT OFFICE 1,969,857

SEED IMMUNIZING MEDIUM

Wilhelm Schepss, Wilhelm Bonrath and Karl Taube, Leverkusen, Germany, assignors to Winthrop Chemical Company, Inc., New York, N. Y., a corporation of New York No Drawing. Application August 20, 1928, Serial No. 300,974. In Germany September 22, 1927

7 Claims. (Cl. 167—38)

The present invention relates to new seed immunizing media.

More particularly it relates to new seed immunizing media substantially identical with mercury compounds of aromatic hydrocarbons containing the mercury linked to the nucleus of the following general formula:

R—Hg—A wherein R represents the residue of a compound of the group comprising aromatic hydrocarbons substituted by substituents of an indifferent character. A stands for the residue of a compound of the group comprising organic and inorganic acids, for instance, such as $-OOC.CH_3$, $-OOC-CH(OH)-CH_3$, $-O.NO_2$, $-O.SO_3H$, —Cl, —CN. Mercury compounds of this kind are, for example, phenyl-mercuric acetate (Journ. Am. Chem. Soc. 46 (1924), 1510,) o-chloro-phenyl-mercuric chloride, -nitrate, -cyanide chromate lactate (obtainable for instance by treating o-chloro-phenylmercuric acetate with sodium chloride, potassium or sodium -cyanide, -chromate e. a.), anisyl-mercuric acetate e. a. The mercury compounds may be incorporated with seed crops in any desired manner advantageously in the presence of a suitable carrier, and when thus applied constitute valuable media for disinfecting and immunizing seed crops.

By the term "substituents of an indifferent character" we mean such substituents as do not lend to the mercuric compounds mentioned a basic or acid character. Such substituents are for instance halogen, the nitro group, alkoxy-, carboxyalkyl-, sulfanilide groups e. a. The incorporating of these compounds with seed grain may be performed in different manners; for instance the seed grain may be dusted or otherwise intimately mixed with our immunizing medium whereby it may be of advantage to add to the latter inert diluents, carriers or wetting agents such as talc metal oxides, -carbonates kieselguhr, the sodium salt of isobutyl naphthalene sulfonic acid, activated charcoal e. a., or to add other disinfecting or immunizing media, f. i. copper salts, arsenic compounds e. a., and it is to be understood, that also such mixtures are intended to be included in our invention.

The following examples illustrate our invention, without limiting it thereto:—

*Example.*—A mixture of o-chlorophenyl-mercuric acetate of the probable formula

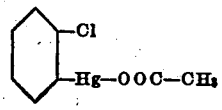

with such a quantity of talc as to yield a mercury content of 1.5% is dusted upon rye-seed infected by fusarium in a proportion of 2:1000. 84% of the rye-seed thus treated germinated, only 1% of the plants being infected whereas, when sowing the untreated rye only 71% germinated, 25% of the plants being infected.

Similar results will be obtained when replacing the o-chloro-phenyl-mercuric acetate by o-chlorophenyl-mercuric-chloride, -cyanide, -lactate, anisyl-mercuric acetate e. a.

We claim:—

1. A seed immunizing medium essentially comprising a compound of the general formula

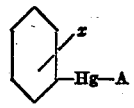

in which A denotes the radical of an acid and any substituent x of the substituent-bearing benzene nucleus is selected from the group of indifferent substituents consisting of halogen, alkoxy, nitro and aliphatic carboxyalkyl groups.

2. A seed immunizing medium comprising a compound of the general formula

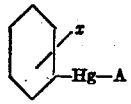

in which A denotes the radical of an acid of low molecular weight selected from the group consisting of halogen hydrides and acetic acid and any substituent x of the substituent-bearing benzene nucleus is selected from the group of indifferent substituents consisting of halogen, alkoxy, and nitro groups.

3. A seed immunizing medium essentially comprising a compound of the general formula

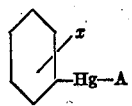

in which A denotes the radical of an acid of low molecular weight selected from the group consisting of hydrochloric and acetic acids and any substituent $x$ of the substituent-bearing benzene nucleus is selected from the group of indifferent substituents consisting of halogen and alkoxy groups.

4. A seed immunizing medium essentially comprising an alkoxy-phenyl mercury acetate.

5. A seed immunizing medium essentially comprising anisyl mercuric acetate.

6. A seed immunizing medium essentially comprising a compound of the general formula

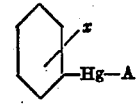

in which A denotes the radical of an acid of low molecular weight selected from the group consisting of hydrochloric and acetic acids and any substituent $x$ of the substituent-bearing benzene nucleus is a halogen group.

7. A seed immunizing medium essentially comprising chlorphenyl mercury acetate.

WILHELM SCHEPSS. [L. S.]
WILHELM BONRATH. [L. S.]
KARL TAUBE. [L. S.]